(12) United States Patent
Bu et al.

(10) Patent No.: US 8,274,902 B2
(45) Date of Patent: Sep. 25, 2012

(54) ESTIMATION METHOD FOR LOSS RATES IN A PACKETIZED NETWORK

(75) Inventors: Tian Bu, Basking Ridge, NJ (US); Jin Cao, Edison, NJ (US)

(73) Assignee: Alcatel Lucent, Paris (FR)

( * ) Notice: Subject to any disclaimer, the term of this patent is extended or adjusted under 35 U.S.C. 154(b) by 90 days.

(21) Appl. No.: 12/462,965

(22) Filed: Aug. 12, 2009

(65) Prior Publication Data

US 2011/0038269 A1    Feb. 17, 2011

(51) Int. Cl.
*H04J 1/16* (2006.01)
(52) U.S. Cl. .......... 370/248; 370/252; 709/224
(58) Field of Classification Search .......... 370/252, 370/328, 248, 242; 709/223, 224
See application file for complete search history.

(56) References Cited

U.S. PATENT DOCUMENTS

| | | | |
|---|---|---|---|
| 6,978,223 B2* | 12/2005 | Milliken | 702/182 |
| 285,500 A1 | 12/2006 | Booth, III et al. | |
| 7,319,668 B2* | 1/2008 | Kobayashi | 370/231 |
| 7,548,558 B2* | 6/2009 | Rakib et al. | 370/466 |
| 2003/0048750 A1* | 3/2003 | Kobayashi | 370/229 |
| 2004/0114576 A1* | 6/2004 | Itoh et al. | 370/352 |
| 2004/0143672 A1* | 7/2004 | Padmanabham et al. | 709/231 |
| 2008/0233951 A1* | 9/2008 | Uchida et al. | 455/425 |
| 2010/0165862 A1* | 7/2010 | Nylander et al. | 370/252 |
| 2010/0220665 A1* | 9/2010 | Govindan et al. | 370/329 |

FOREIGN PATENT DOCUMENTS

WO  WO02/39673 A1  5/2002
WO  PCT/US2010/044095  11/2010
* cited by examiner

*Primary Examiner* — Andrew Lee
(74) *Attorney, Agent, or Firm* — M. I. Finston

(57) ABSTRACT

A method is provided, according to which data are collected on downstream packet losses at a single point in a network. From from the collected data, packet loss rates are estimated on at least two subnetworks downstream of the collection point. The respective subnetworks may differ by one or more links.

6 Claims, 7 Drawing Sheets

ESTIMATION METHOD FOR LOSS RATES IN A PACKETIZED NETWORK

FIELD OF THE INVENTION

The invention relates to methods for monitoring the performance of networks, and more particularly to the determination of packet loss rates.

ART BACKGROUND

The performance of data networks is sensitive to the loss of packets. To be able to optimize the performance of a network, the operator needs to have information about packet losses on various links of the network. For example, one major reason for packet losses is buffer overflow. By identifying and quantifying the loss rate attributable to buffer overflow at a node of the network, the network operator may be able to apply policies that relieve the traffic load at the overloaded link or overloaded node of the network.

The danger of overloads that lead to packet loss has become especially acute in 3G and 4G wireless networks. One reason is that on such networks there is competition for network resources among data applications, voice applications, and video and other applications, each of which has different bandwidth requirements and different delivery modes. This competition is exacerbated by the limited bandwidth available for content delivery over the air interface, and by the high volume of signaling overhead that is typically required to enable wireless communication.

As a consequence, there is an especially great need to monitor packet losses in advanced wireless networks. Particular advantage would be gained by monitoring most or all links between, e.g., the GGSN of a GPRS-supported network such as a W-CDMA mobile telecommunications network and each of the base stations with which the GGSN is associated. To do this by conventional methods, however, would require a monitoring device to be deployed on each of the links that are to be monitored. Because advanced wireless networks, among others, may have hundreds, or even thousands, of such links, such a wide deployment of monitoring devices is not usually feasible.

Therefore, there remains a need for methods of monitoring packet losses that can be deployed from a limited number of locations on the network and still obtain information on the loss rates on many individual links.

SUMMARY OF THE INVENTION

We have discovered such a method. Our method involves collecting data on downstream packet losses at a single point in a network, and from the collected data, estimating packet loss rates on at least two subnetworks downstream of the collection point, wherein the subnetworks differ by at least one link.

In particular embodiments, the data collection is performed by a dedicated hardware monitoring device. In some embodiments, such a device is deployed on the first link below the GGSN (GPRS Support Node) of a GPRS core network.

In particular embodiments, the collected data relate to packet losses on the core network, or the portion thereof, extending from the monitoring point to a plurality of base stations, and in some embodiments even extending to the mobile stations supported by the base stations.

BRIEF DESCRIPTION OF THE DRAWING

FIGS. 3 and 4 should be read together.

FIGS. 5 and 6 should be read together.

DETAILED DESCRIPTION

Figure 1:
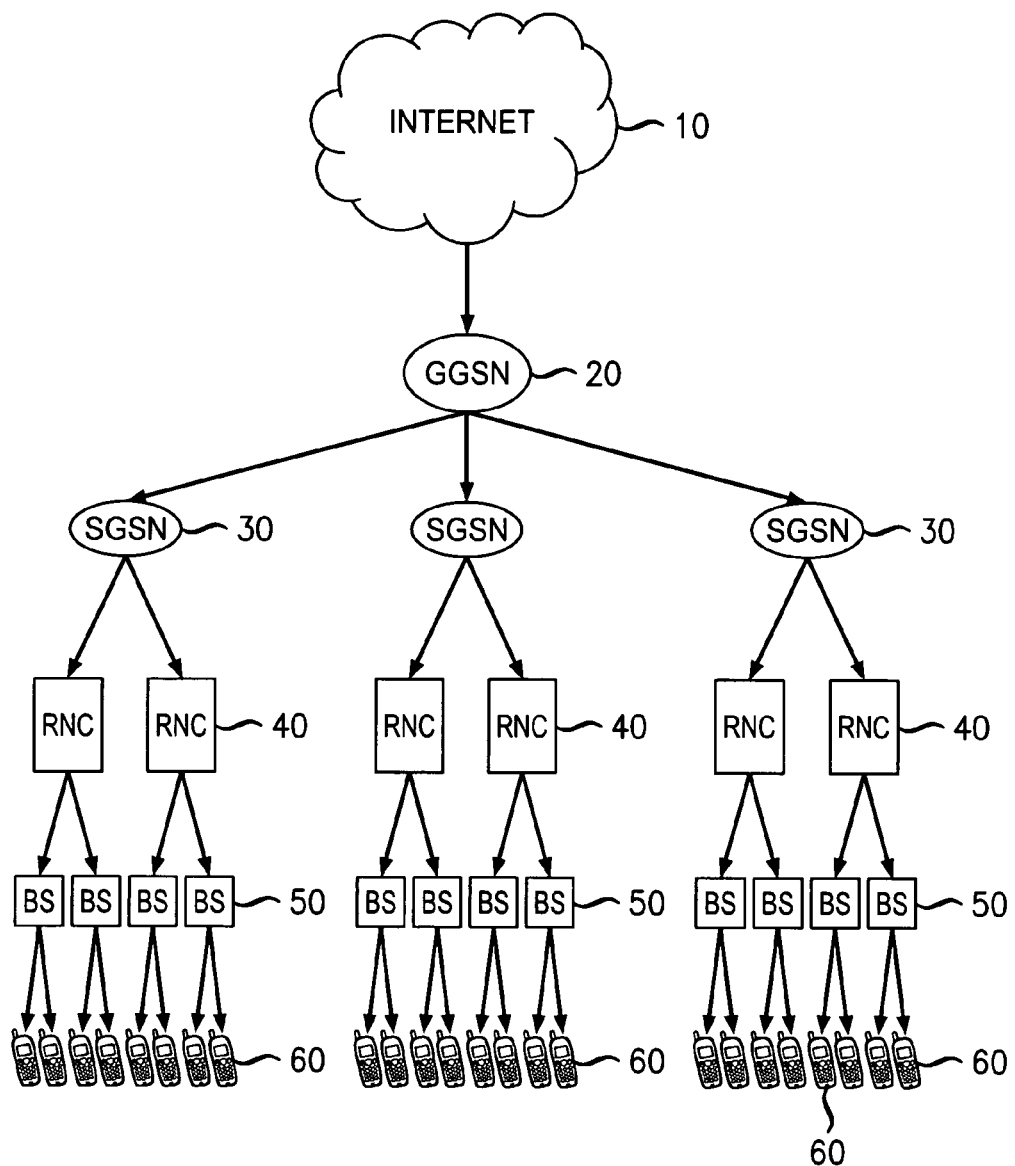
FIG. 1 is a simplified schematic diagram of a portion of a typical wireless communication network having a GPRS core network.

Schematically illustrated in FIG. 1 is a portion of a typical wireless communication network having a GPRS core network. Proceeding in a downstream direction, it will be seen that from the Internet 10, there are links to GGSN 20, from the GGSN there are links to multiple SGSNs (Serving GPRS Support Nodes) 30, from each SGSN there are links to multiple RNCs (Radio Network Controllers) 40, and from each RNC there are links to multiple base stations 50. Each base station may be in contact with multiple mobile stations 60.

It will be evident from FIG. 1 that from the GGSN down at least to the base stations, the various network elements form the nodes of a tree graph rooted at the GGSN, and the links from each element to the elements below it form the vertices of the tree graph.

Our method can be applied to any packetized communication network that may be represented by a tree graph. As noted above, wireless GPRS networks such as the network of FIG. 1 are one example where our method is especially useful. However, applications of our method are not limited to GPRS networks or to wireless networks.

Our method may be deployed on a computer or digital processor running at a network node such as the GGSN or other node of FIG. 1, or it may be deployed on a dedicated machine. The machine on which it is deployed may be, e.g., a general-purpose machine operating under software instructions, or a special-purpose machine operating under the control of hardware or firmware.

Figure 2:
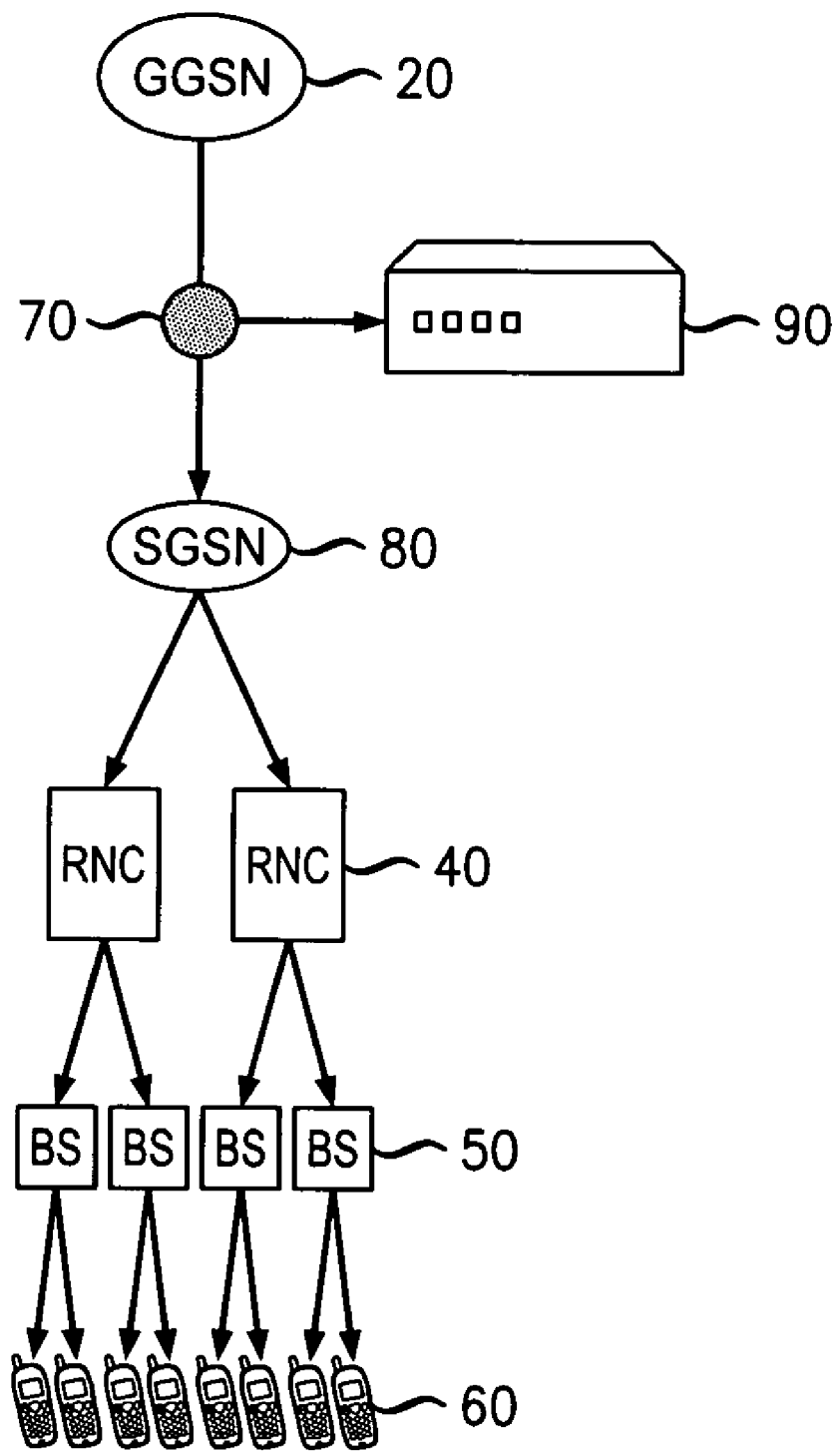
FIG. 2 is a view of a portion of the network of FIG. 1, modified to show the inclusion of a tap for practicing the invention in an exemplary embodiment.

In some embodiments, the machine on which the message is deployed will collect packet loss information by diverting a copy of packet traffic through a tap installed at an intermediate point on a link. For example, FIG. 2 shows a portion of the network of FIG. 1, in which tap 70 has been added on the link between GGSN 20 and SGSN 80, and monitoring device 90 receives copied and diverted packets from tap 70. Monitoring devices that can gather information from diverted packets and have the necessary computational power to support implementations of our method are well known and need not be described here in detail.

In general, tap 70 may be situated at any point at or below the GGSN, because at such locations it will generally be able to obtain the network topology from signaling information. The monitoring device needs to know the topology of the tree network downstream of its location in order to be able to infer packet loss rates according to the method to be described.

Figure 3:
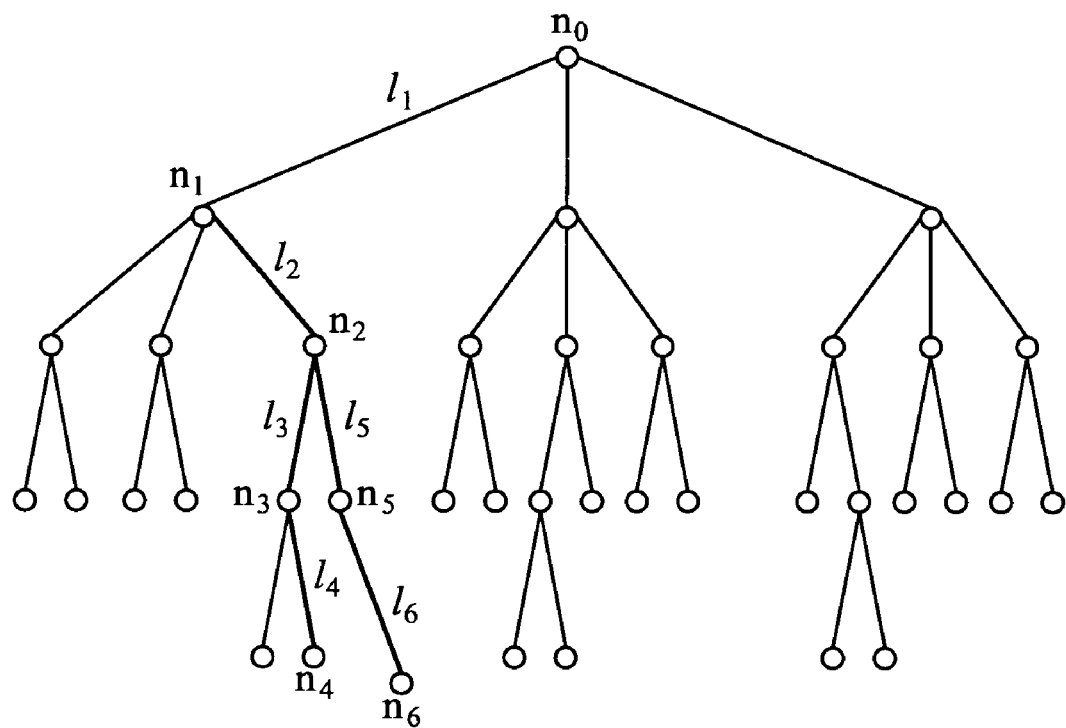
FIG. 3 is an example of a tree graph.
Figure 4:
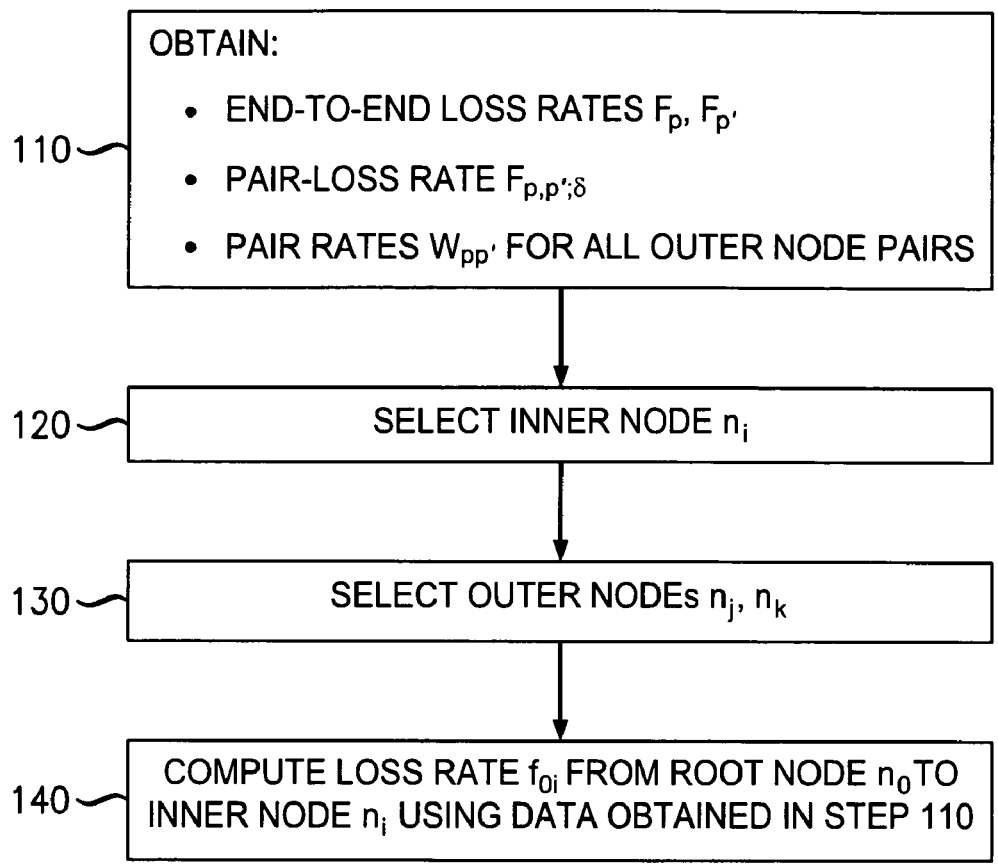
FIG. 4 is a flow chart of a procedure useful in implementing the invention, in an exemplary embodiment.

We will now describe an illustrative embodiment of our method with reference to FIGS. 3 and 4. FIG. 3 shows a generalized example of a tree graph having five levels. FIG. 4 is a flowchart of the steps of a procedure that we will refer to, below, as Algorithm 1.

Turning back to FIG. 3, it should be noted that the number of levels in the tree graph is arbitrary and a five-level graph has been selected solely for purposes of illustration. In some practical applications, our method will be applied to networks whose tree graph has fewer than five levels. For example, the method may usefully be applied to the graph rooted at the GGSN of FIG. 1. If the leaves of the graph are considered to be the mobile stations, the graph will have five levels, whereas if the leaves are considered to be base stations, the graph will have only four levels.

It should be noted in this regard that in at least some implementations, it will be desirable to include the mobile stations as the leaves of the graph, but the mobile stations may be so numerous that it is not computationally feasible to consider individual air-interface links. In such cases, it will be advantageous to group the mobile stations into lumped, equivalent nodes in such a way that each base station serves at least two equivalent nodes. Although such an approach does not yield loss rates on individual air links, it will often provide useful information about loss rates as averaged over populations of air links.

In FIG. 3, the root node is labeled $n_0$. We refer to the leaves of the tree graph, such as nodes $n_4$ and $n_6$, as "end nodes." We refer to all nodes between the root and the end nodes as "intermediate nodes." Examples of intermediate nodes are nodes $n_2$, $n_3$, and $n_5$.

One important observation we have made is that information collected at one link of the network, relating to losses of correlated pairs of packets, may be probative of loss rates on other, downstream links of the network. To put this observation into practice, we have defined a "pair" as two packets, destined for different end nodes, that were both transmitted from the root node within a time interval $\delta$. The value of $\delta$ may be specified by the operator, or it may be determined adaptively. In many networks, there will be a high correlation between the losses of packets transmitted sufficiently close in time, not least because if one packet is dropped due to buffer overflow, a packet following a short time later is likely to meet the same fate. Although useful values for $\delta$ will depend on the properties of the specific network of interest, typical values in a W-CDMA network could lie in the range 50-100 ms.

There are currently available monitoring devices that can determine the packet loss rate, i.e., the fraction of packets that are lost over a suitable time-averaging interval, on the end-to-end path from the monitoring point to a network element that serves as a leaf node. One such device is the Alcatel-Lucent 9900 Wireless Network Guardian, which is available from Alcatel-Lucent Inc., having an office at 600 Mountain Avenue, Murray Hill, N.J. When such a device is situated, for example, at or just below the GGSN of a GPRS core network, it can readily measure the end-to-end packet loss rates between the GGSN and the mobile stations (individually or as grouped into equivalent nodes) served by the base stations associated with that GGSN.

Accordingly, one quantity that is measurable in many networks is the end-to-end packet loss rate $F_i$ from a root node $n_0$ to an end node $n_i$. Given two distinct end nodes $n_i$, $n_j$, another often-measurable quantify is the probability $F_{i,j;\delta}$ that a packet destined for $n_i$ and a packet destined for $n_j$ will both be lost, given that the two packets belong to a pair as defined above.

Another quantity that is measurable in many networks is the fraction $W_{ij}$ of all packet pairs (counted over a suitable averaging period) transmitted from the root node that are destined for a given pair of end nodes $n_i$, $n_j$. That is, for all end nodes $n_i$, $n_j$, i≠j, let $N_{ij}$ represent the total count, over the averaging period, of packet pairs destined for $(n_i, n_j)$. Then in general, $W_{ij}=N_{ij}/\Sigma N_{lm}$, wherein the summation (i.e., over indices l, m) is taken over all pairs of distinct end nodes. For implementations of the method to be described below, the summation is taken only over all pairs of distinct outer nodes, which are defined below.

We will now describe a procedure, referred to herein as Algorithm 1, for estimating the packet loss rate $f_{0i}$ from a root node $n_0$ to a selected intermediate node $n_i$. Thus, for example, Algorithm 1 might be applied to estimate the loss rate from the root node to node $n_2$ of FIG. 3, i.e., the loss rate over the path that is the concatenation of paths $l_1$ and $l_2$. We refer to the selected intermediate node as the "inner node". Those skilled in the art will understand that the precise process steps are subject to numerous variations, and as described are merely illustrative.

There is a criterion that an intermediate node must meet in order for it to be eligible as an inner node. To be eligible, the selected intermediate node must be a root node relative to at least two end nodes via distinct branches that intersect at the selected node. For example, node n2 of FIG. 3 is a branch point of the tree graph. One branch goes to node n3 and from there has two sub-branches, one of which terminates at end node n4. The other branch goes to node n5 and then terminates at end node n6.

We also introduce here the concept of an outer node, which was mentioned above. Given a selected inner node, a pair of end nodes are outer nodes if: (1) the selected inner node is a root relative to the selected end nodes, and (2) at least two distinct branches intersect at the selected inner node, each of which terminates at a respective one of the selected end nodes. In the example of FIG. 3, n4 and n6 qualify as outer nodes (relative to selected inner node n2).

Turning now to FIG. 4, the first step 110 of the procedure is to obtain from measurements: The end-to-end loss rate $F_p$ from the root node $n_0$ to each possible outer node $n_p$, the pair-loss rate $F_{p,p';\delta}$ from the root node $n_0$ to each possible pair of outer nodes $n_p$, $n_{p'}$, and the pair fractions $W_{p,p'}$ for all possible pairs $n_p$, $n_{p'}$ of outer nodes. (As noted elsewhere in this description, in the event that there is a large number of possible outer nodes, computational economy can be achieved by artificially grouping pluralities of end nodes into lumped, equivalent nodes.)

The next step 120 of the procedure is to select an inner node $n_i$. In the example of FIG. 3, node $n_2$ is selected as the inner node.

The next step 130 is to select two end nodes $n_j$, $n_k$ which qualify as outer nodes. The next step 140 is to compute an estimate of the packet loss rate $f_{0i}$ from the root node $n_0$ to the selected inner node $n_i$ using the information obtained in step 110. Formulas for making the computation are provided below. In the example of FIG. 3, the loss rate $f_{02}$ is estimated from the end-to-end loss rates $F_p$, the pair fractions $W_{lm}$, and $F_{4,6;\delta}$.

Figure 5:
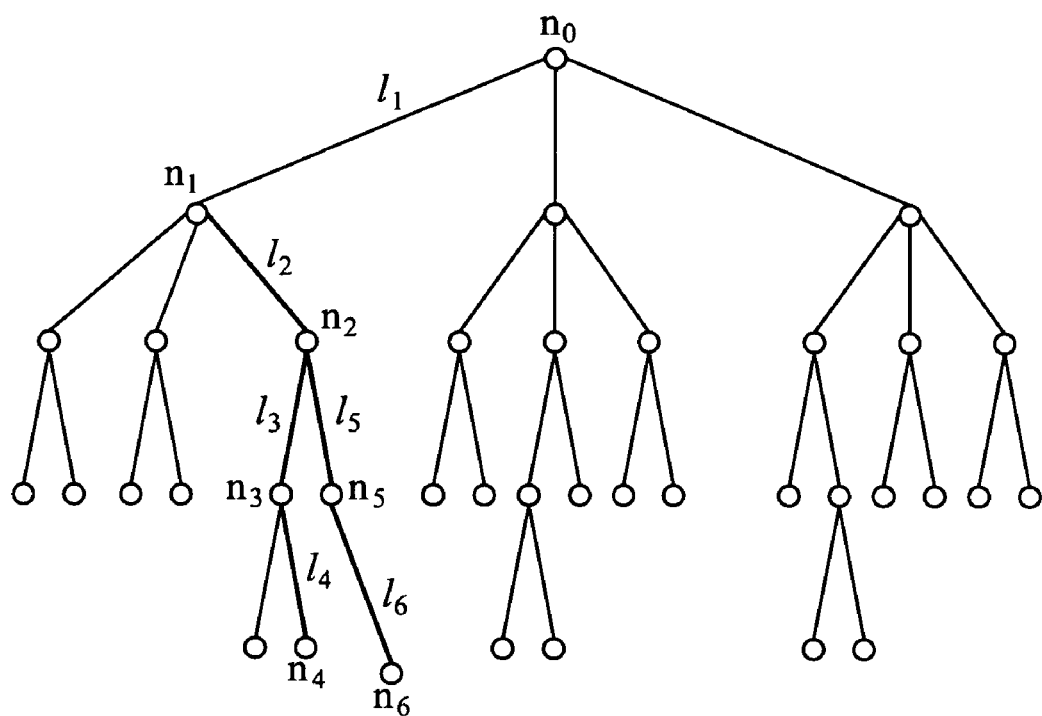
FIG. 5 is a detail of the tree graph of FIG. 3.
Figure 6:
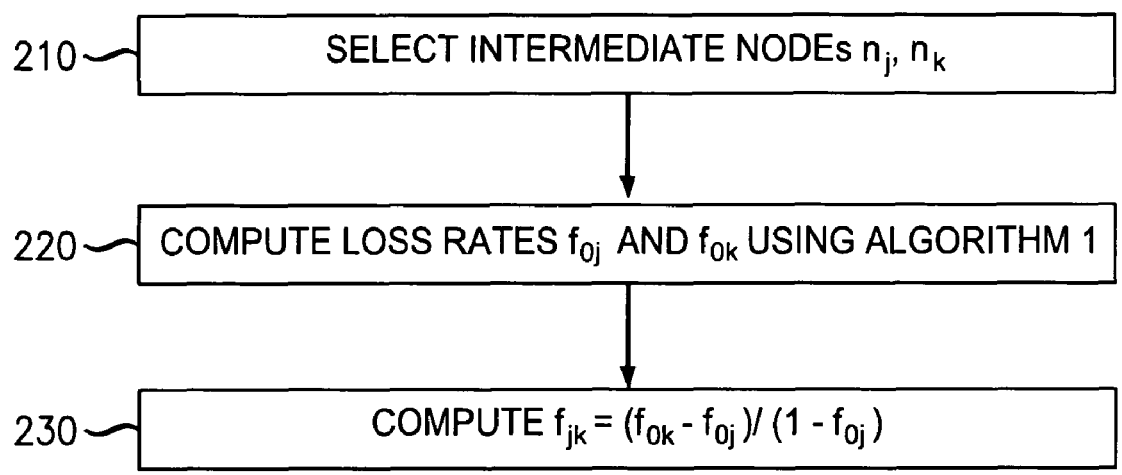
FIG. 6 is a flow chart of a procedure useful in implementing the invention, in an exemplary embodiment.

We will now describe a procedure, referred to here as Algorithm 2, for estimating the packet loss rate on a path $P_{jk}$ from a selected intermediate node $n_j$ to a selected intermediate node $n_k$ lying below $n_j$ in the tree graph. In order for the selected intermediate nodes $n_j$ and $n_k$ to be eligible for application of Algorithm 2, each of them must qualify as an inner node relative to at least one pair of outer nodes, as defined above in connection with Algorithm 1. Algorithm 2 will be described with reference to FIGS. 5 and 6. FIG. 5 shows the tree graph of FIG. 3 with further detail. FIG. 6 is a flowchart of the steps of Algorithm 2. Those skilled in the art will understand that the precise process steps are subject to numerous variations, and as described are merely illustrative.

In the example of FIG. 5, the packet loss rate will be estimated on the path $P_{13}$ from node n1 to node n3. With reference to FIG. 5, this path may be described as the concatenation of links $l_2$ and $l_3$.

Turning now to FIG. 6, the first step 210 of the procedure is to select the intermediate nodes $n_j$, $n_k$. In the example of FIG. 5, as noted, the selected intermediate nodes are n1, n3.

The next step 220 is to compute the loss rates $f_{0j}$ and $f_{0k}$, using Algorithm 1. In the example of FIG. 5, the computed loss rates are $f_{01}$, i.e., the loss rate on link $l_1$, and $f_{03}$, i.e., the loss rate on the path that is the concatenation of links $l_1$, $l_2$, and $l_3$.

The next step 230 is to compute the loss rate $f_{jk}$ between the selected intermediate nodes from the rates obtained in step 220. In the example of FIG. 5, the loss rate $f_{13}$ is the loss rate on the path that is the concatenation of links $l_2$, and $l_3$.

It will be evident from FIG. 5, that step 230 may be thought of as decomposing a three-level path n0-to-n1-to n3 into a pair of two-level paths n0-to-n1 and n0-to-n3, in order to obtain the packet loss rate on the difference between the two paths resulting from the decomposition.

The formula used in step 230 is $f_{jk}=(f_{0k}-f_{0j})/(1-f_{0j})$. In the example of FIG. 5, the computation is $f_{13}=(f_{03}-f_{01})/(1-f_{01})$. In applying the formula, negative values of $f_{jk}$ are rounded up to zero.

By repeatedly applying Algorithms 1 and 2, it is readily achievable to estimate the packet loss rate on every qualifying link. A link is qualifying if (a) it terminates on an end node, or (b) it terminates on an eligible inner node.

Figure 7:
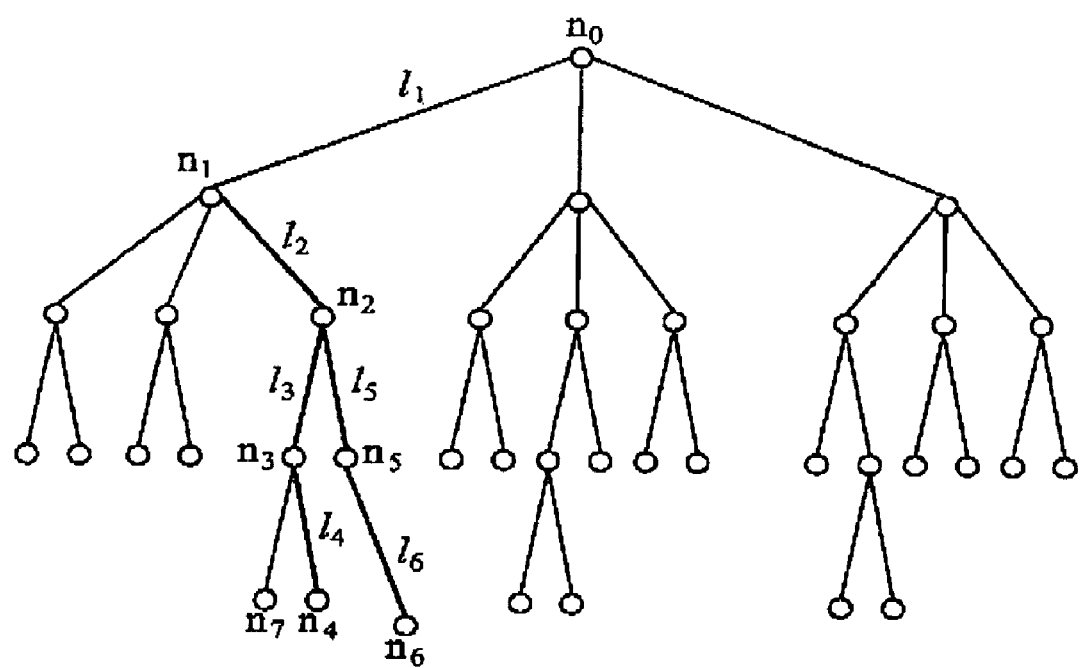
FIG. 7 is a further view of the tree graph of FIG. 3.

For example, we will now describe with reference to FIG. 7 a procedure for estimating the packet loss rate on each link of a path from root node $n_0$ to end node $n_4$.

The end-to-end loss rate from $n_0$ to $n_4$ is measurable. Consequently, $f_{04}$ is taken as $F_4$.

The end-to-end loss rate $f_{03}$ from $n_0$ to the intermediate node $n_3$ is computed by Algorithm 1 using the measured values of the end-to-end loss rates from the root node $n_0$ to nodes $n_4$ and $n_7$ and the measured value of the pair-loss probability $F_{4,7;8}$. Then Algorithm 2 is used to compute the loss rate $f_{34}$ on link $l_4$.

Algorithm 1 is then used to compute the loss rate $f_{02}$ from $n_0$ to intermediate node n2 using the measured values of the end-to-end loss rates from the root node $n_0$ to nodes $n_4$ and $n_6$ and the measured value of the pair-loss probability $F_{4,6;8}$. Algorithm 2 is then used to compute the loss rate $f_{23}$ on link $l_3$, using the determined values of $f_{02}$ and $f_{03}$.

Algorithm 1 is then used to compute the loss rate $F_{01}$ from $n_0$ to $n_1$ using the measured values of the end-to-end loss rates from $n_0$ to $n_4$ and a further node $n_8$ (not identified in the figure) and the measured value of the pair-loss probability $F_{4,8;\delta}$. Algorithm 2 is then used to compute the loss rate $f_{12}$ on link $l_2$ from $f_{01}$ and $f_{02}$.

The loss rate from $n_0$ to $n_1$, i.e., the loss rate on link $l_1$, is set to rate $f_{01}$, which has been computed using Algorithm 1.

Mathematical Details

Let $n_k$ be a selected inner node, and let $n_i$ and $n_j$ be corresponding outer nodes. Let $f_{0k}$ be the packet loss rate from the root node $n_0$ to node $n_k$, and let $f_{ki}$ and $f_{kj}$ be the respective packet loss rates from $n_k$ to $n_i$, and from $n_k$ to $n_j$. Under the assumptions that the two packets in a packet pair will experience the same loss event, i.e., either both will succeed or both will fail to arrive, and that loss events on different links are independent, it can be shown that $$F_{ij}-F_iF_j=f_{0k}(1-f_{0k})(1-f_{ki}f_{kj})$$

and hence that $$\sum_{i \neq j} W_{ij}(F_{ij} - F_i F_j) = f_{0k}(1 - f_{0k})\left(1 - \sum_{i \neq j} W_{ij} f_{ki} f_{kj}\right),$$

the sum being taken over all possible pairs of outer nodes.

Now define the weighted average $F_{pair}$ of the probability that both packets of the pair will be lost by $$F_{pair} = \sum_{i \neq j} W_{ij} F_{ij},$$

where the sum is taken over all possible pairs of outer nodes. Since $f_{ki}$ cannot be greater than $F_i$, it follows that $$f_{0k}(1 - f_{0k})\left(1 - \sum_{i \neq j} W_{ij} F_i F_j\right) \le \sum_{i \neq j} W_{ij}(F_{ij} - F_i F_j) =$$

$$\sum_{i \neq j} (F_{pair} - W_{ij} F_i F_j) \le f_{0k}(1 - f_{0k})$$

It follows that $f_{0k}$ has lower and upper bounds as expressed by $$\frac{1 - \sqrt{1 - 4\frac{F_{pair} - \sum_{i \neq j} W_{ij} F_i F_j}{1 - \sum_{i \neq j} W_{ij} F_i F_j}}}{2} \le f_{0k} \le \frac{1 - \sqrt{1 - 4\left(F_{pair} - \sum_{i \neq j} W_{ij} F_i F_j\right)}}{2}.$$

According to a useful approximation for simplifying the above formula, it is assumed that the occurrence of a packet pair for a given leaf pair is independent of the leaves themselves; that is, a packet goes to a branch i with probability $w_i$, and thus that $$W_{ij} \cong \frac{w_i w_j}{1 - \sum_i w_i^2}.$$

Under the above assumption, $$\sum_{i \neq j} W_{ij} F_i F_j \cong \frac{1}{1 - \sum_i w_i^2}\left(\left(\sum_i w_i F_i\right)^2 - \sum_i w_i^2 F_i^2\right).$$

Hence, it may be sufficient to track the individual packet fractions $w_i$, rather than the pair fractions $W_{ij}$, to get a useful approximation of the upper and lower bounds.

Now define the average end-to-end loss rate $F_L$ to the leaves, by $$F_L = \sum_i w_i F_i,$$

the sum being taken over all leaves, i.e., end nodes, that are possible outer nodes. Hence, $$\sum_{i \neq j} W_{ij} F_i F_j \cong \frac{1}{1 - \sum_i w_i^2} \left( F_L^2 - \sum_i w_i^2 F_i^2 \right)$$

using the preceding approximation. If there are many leaves but packet arrivals are sufficiently uniform among the leaves that none of them dominate, the sum $$\sum_i w_i^2$$

will be small. If the sum is taken as negligibly small, there follows the approximation $$\sum_{i \neq j} W_{ij} F_i F_j \cong F_L^2,$$

which yields approximate lower and upper bounds according to the expression, $$\frac{1 - \sqrt{1 - 4\frac{F_{pair} - F_L^2}{1 - F_L^2}}}{2} \leq f_{0k} \leq \frac{1 - \sqrt{1 - 4(F_{pair} - F_L^2)}}{2}.$$

As noted above, a computational simplification can be achieved in the event there are many leaf branches by grouping the branches into a plurality of lumped pseudo-branches. This grouping is advantageously performed randomly. This can be done without a substantial loss in estimation efficiency. That is, the only information that is effaced by the grouping is that relating to packet pairs whose respective destinations fall into the same group. Therefore, provided there are, e.g., at least 10 groups, information on no more than 10% of the packet pairs will be lost.

As described above, the various summations involved in the computations for Algorithm 1 are carried out over all possible pairs of outer nodes. In an alternative approach for applying Algorithm 1, we do the following:

For a given inner node, consider each of its branches and all of the end nodes that terminate those branches. Group all end nodes that terminate a given branch into an artificial, lumped end node. By treating the lumped end nodes as single nodes, the portion of the tree graph extending from the given inner node to the lumped end nodes is transformed into a two-level tree with, typically, many branches, each branch terminated by one of the lumped end nodes. When this alternative approach is applied, the summations are taken over all possible pairs of the (distinct) lumped end nodes.

In at least some cases, the alternative approach described above may be advantageous both by reducing the amount of computation and by increasing accuracy. The reason is that there are fewer effective outer nodes over which to perform the summations, and the consolidation of outer nodes mitigates the inaccuracies that might occur in determinations of end-to-end loss rates when too few packets are destined for some end nodes.

What is claimed is:

1. A method, comprising:
   collecting data on downstream packet losses at a single collection point in a network that branches, downstream of the collection point, toward a plurality of end nodes and that includes nodes intermediate the collection point and at least some of the end nodes, wherein the data describe downstream end-to-end packet loss between the collection point and two or more end nodes on different branches of the network; and
   from the collected data, estimating a packet loss rate on at least one path that begins or ends on an intermediate node and that includes or begins or ends on an intermediate node that is a branch point of the network.

2. The method of claim 1, wherein the data collection is performed by a dedicated hardware monitoring device.

3. The method of claim 1, wherein the data collection is performed by a dedicated hardware monitoring device deployed on the first link below the GPRS Support Node (GGSN) of a GPRS core network.

4. The method of claim 1, wherein the collected data relate to packet losses on the portion of a GPRS core network extending from the collection point to a plurality of base stations.

5. The method of claim 1, wherein the collected data relate to packet losses on the portion of a GPRS core network extending from the collection point to a plurality of mobile stations.

6. A monitoring device, comprising:
   an input for collecting data on downstream packet losses at a single collection point in a network that branches, downstream of the collection point, toward a plurality of end nodes and that includes nodes intermediate the collection point and at least some of the end nodes, wherein the data describe downstream end-to-end packet loss between the collection point and two or more end nodes on different branches of the network; and
   a circuit configured to compute from the collected data an estimate of a packet loss rate on at least one path that begins or ends on an intermediate node and that includes or begins or ends on an intermediate node that is a branch point of the network.

* * * * *